(12) United States Patent
Tanimoto

(10) Patent No.: US 6,963,427 B1
(45) Date of Patent: Nov. 8, 2005

(54) NETWORK FACSIMILE SYSTEM AND SUPERVISING SERVER THEREFOR

(75) Inventor: Yoshifumi Tanimoto, Uji (JP)

(73) Assignee: Murata Kikai Kabushiki Kaisha, Kyoto (JP)

(*) Notice: Subject to any disclaimer, the term of this patent is extended or adjusted under 35 U.S.C. 154(b) by 985 days.

(21) Appl. No.: 09/680,727

(22) Filed: Oct. 5, 2000

(30) Foreign Application Priority Data

| Oct. 7, 1999 | (JP) | ................................. 11-284104 |
| Oct. 7, 1999 | (JP) | ................................. 11-287105 |
| Mar. 3, 2000 | (JP) | ............................. 2000-058475 |
| Mar. 3, 2000 | (JP) | ............................. 2000-058476 |
| Mar. 3, 2000 | (JP) | ............................. 2000-058477 |

(51) Int. Cl.[7] .............................................. H04N 1/32
(52) U.S. Cl. ...................... 358/400; 358/401; 358/402; 358/1.15; 358/407; 358/442; 709/223; 709/250; 709/202; 709/224; 709/225; 709/226; 717/147
(58) Field of Search ................................ 358/400, 401, 358/403, 1.15, 407, 442; 709/223, 250, 202, 709/224, 225, 226; 711/147; 379/100.01–100.09

(56) References Cited

U.S. PATENT DOCUMENTS

| 5,170,428 | A | * | 12/1992 | Watanabe et al. ...... 379/100.09 |
| 5,530,907 | A | * | 6/1996 | Pavey et al. .................... 710/69 |
| 5,857,073 | A | * | 1/1999 | Tsukamoto et al. .......... 709/208 |
| 6,144,975 | A | * | 11/2000 | Harris, Jr. et al. ........... 715/500 |
| 6,237,099 | B1 | * | 5/2001 | Kurokawa .................... 713/200 |
| 6,335,966 | B1 | * | 1/2002 | Toyoda ................... 379/100.06 |
| 6,396,597 | B1 | * | 5/2002 | Marshall ....................... 358/400 |
| 6,417,934 | B1 | * | 7/2002 | Sadr-Salek ................... 358/442 |
| 6,564,193 | B1 | * | 5/2003 | Shore et al. ................. 705/400 |

FOREIGN PATENT DOCUMENTS

| JP | 04-114250 | 4/1992 |
| JP | 04-220872 | 8/1992 |
| JP | 06-233037 | 8/1994 |
| JP | 06-233040 | 8/1994 |
| JP | 06-261164 | 9/1994 |
| JP | 07-131571 | 5/1995 |
| JP | 08-202659 | 8/1996 |
| JP | 09-247416 | 9/1997 |
| JP | 09-282253 | 10/1997 |
| JP | 09-321928 | 12/1997 |
| JP | 11-046206 | 2/1999 |
| JP | 11-115277 | 4/1999 |
| JP | 11-146005 | 5/1999 |
| JP | 11-154963 | 6/1999 |
| JP | 11-163872 | 6/1999 |
| JP | 11-215180 | 8/1999 |
| JP | 11-355442 | 12/1999 |
| JP | 2000-032202 | 1/2000 |
| JP | 2000-125068 | 4/2000 |
| JP | 2000-287004 | 10/2000 |
| JP | 2001-111757 | 4/2001 |
| JP | 2002-223342 | 8/2002 |

* cited by examiner

Primary Examiner—Edward Coles
Assistant Examiner—Alan Rahimi
(74) Attorney, Agent, or Firm—Hogan & Hartson, LLP

(57) ABSTRACT

A supervising server (2) is connected to a communication network. The communication network includes a plurality of clients (3) and facsimile servers (1). The supervising server (2) has recipient information such as facsimile numbers of recipients, and the clients (3) can refer to the recipient information under predetermined constraint. All the information about recipients is administered by the supervising server (2). The facsimile servers and clients communicate with each other via the supervising server.

4 Claims, 19 Drawing Sheets

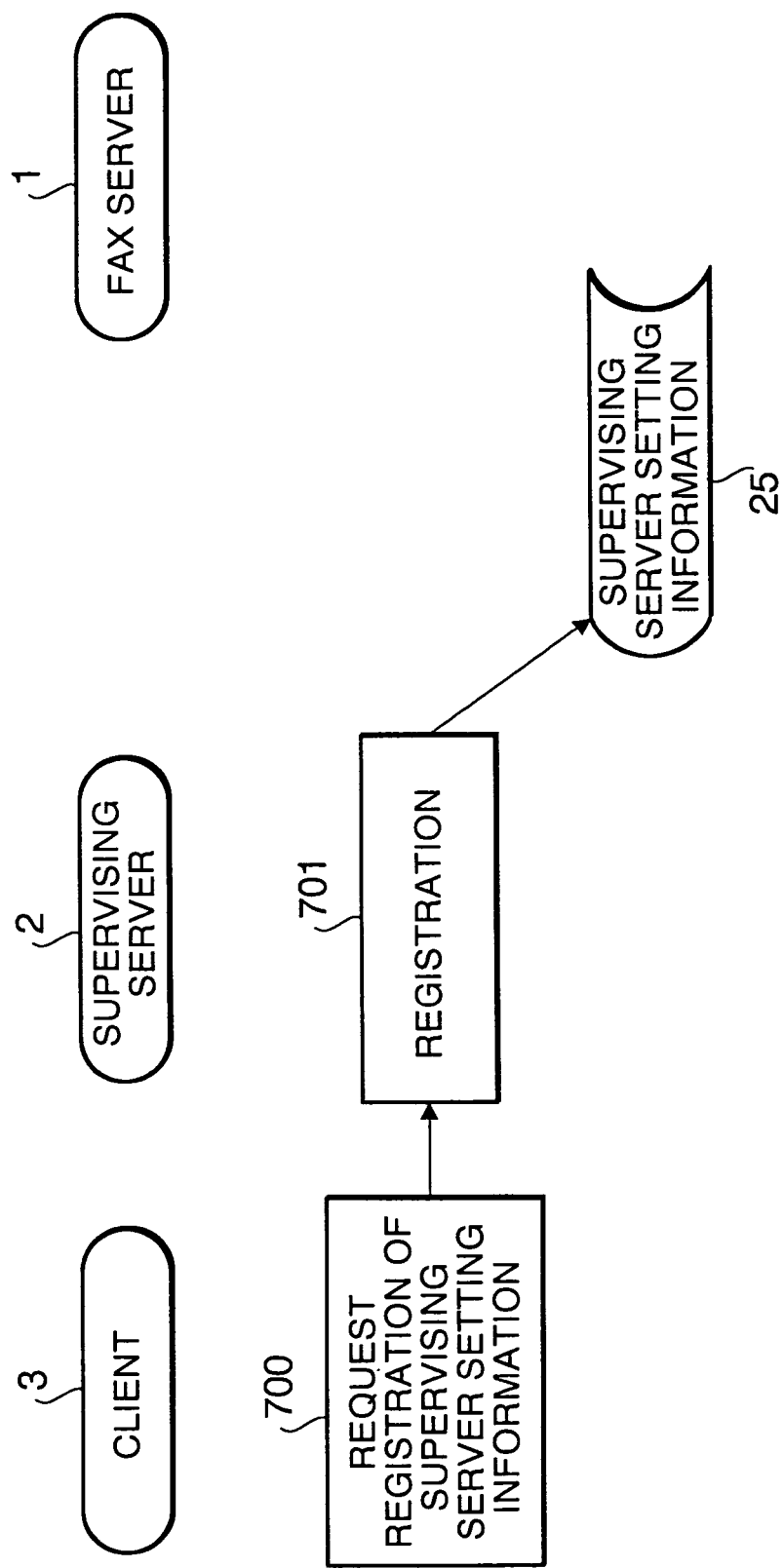

FIG. 9A

ADMINISTRATION TABLE — 26

| ADMINISTERED MACHINE | ADMINISTRATOR |
|---|---|
| FAX SERVER A | CLIENT X |
| FAX SERVER B | CLIENT X |
| FAX SERVER C | CLIENT Z |
| SUPERVISING SERVER | CLIENT Z |
| ⋮ | ⋮ |

FIG. 9B

ADMINISTRATOR LIST — 27

CLIENT X
CLIENT Y
CLIENT Z
⋮

FIG. 11

ADMINISTRATION TABLE

| ADMINISTERED MACHINE | ADMINISTRATOR | PASSWORD |
|---|---|---|
| FAX SERVER A | CLIENT X | aaaakkjsssss |
| FAX SERVER B | CLIENT X | xxxxyyykkaa |
| FAX SERVER C | CLIENT Z | aa2563sssss |
| SUPERVISING SERVER | CLIENT Z | bb7685gj ui s |

FIG. 12

ADMINISTRATION TABLE

| ADMINISTERED MACHINE | ADMINISTRATOR | AUTHORITY |
|---|---|---|
| FAX SERVER A | CLIENT X | IP ADDRESS CHANGE |
| FAX SERVER B | CLIENT X | SPEED DIAL NO. CHANGE |
| FAX SERVER C | CLIENT Z | BROADCAST DESTINATION CHANGE |
| SUPERVISING SERVER | CLIENT Z | IP ADDRESS CHANGE |

FIG. 13A

CLIENT – GROUP TABLE

| CLIENT | GROUP |
|--------|-------|
| X | abc |
| Y | bbc |
| Z | bbc,ddx |
| ⋮ | ⋮ |

FAX SERVER – GROUP TABLE

| FAX SERVER | GROUP |
|------------|-------|
| A | abc |
| B | bbc,ddx |
| C | bbc |
| ⋮ | ⋮ |

| ALL CLIENT COMMON TELEPHONE DIRECTORY | | | |
|---|---|---|---|
| RECIPIENT NAME | FAX NO. | e – mail | OPTIONS |
| 00 MACHINERY, INC. | 075 – 123 – 4567 | abc@xxx.co.jp | CONFIDENTIAL |
| XX INDUSTRIES, INC. | 03 – 1111 – 2222 | ddd@xxx.com | – |

FIG. 16B

| CLIENT X EXCLUSIVE TELEPHONE DIRECTORY | | | |
|---|---|---|---|
| RECIPIENT NAME | FAX NO. | e – mail | OPTIONS |
| YY, INC. | 06 – 1111 – 3333 | ppp@aaa.com | – |
| ZZ, INC. | 03 – 9999 – 1111 | aaa@bbb.ne.jp | – |

FIG. 16C

| CLIENT Y EXCLUSIVE TELEPHONE DIRECTORY | | | |
|---|---|---|---|
| RECIPIENT NAME | FAX NO. | e – mail | OPTIONS |
| ABC CORP. | 06 – 1112 – 9999 | ppp@aaa.co.jp | – |
| DEF CORP. | 06 – 2222 – 2525 | uuu@bbb.co.jp | – |

FIG. 18

TELEPHONE DIRECTORY (33)

| ATTRIBUTE | RECIPIENT INFORMATION | FAX NO. | e-mail | OPTIONS |
|---|---|---|---|---|
| COMMON | 00 MACHINERY INC. | 075-123-4567 | abc@xxx.co.jp | CONFIDENTIAL |
| | XX INDUSTRIES INC. | 03-1111-2222 | ddd@xxx.com | — |
| CLIENT A | ABC INC. | 06-1111-3333 | ppp@aaa.com | — |
| CLIENT B | DEF INC. | 03-9999-1111 | aaa@bbb.ne.jp | — |

(33A)

NETWORK FACSIMILE SYSTEM AND SUPERVISING SERVER THEREFOR

BACKGROUND OF THE INVENTION

1. Field of the Invention

The present invention relates to improvement of network facsimile system that includes a plurality of facsimile servers and a plurality of clients connected over a communication network.

2. Description of the Related Art

In recent years, network facsimile systems prevail in offices and play an important role in data communication.

One of such network facsimile systems is schematically illustrated in FIG. 20 of the accompanying drawings. This system is constituted by connecting a plurality of facsimile servers 91 (#1 to #n) and a plurality of clients 93 (#1 to #n) by LAN. LAN is one example of communication networks. The facsimile servers 91 are connected to a public switched telephone network (PSTN) N1.

If one of the clients 93 wishes to send data to a remote party via facsimile, it designates one of the facsimile servers 91 and sends data to that facsimile server. The client 93 also instructs facsimile data transmission along with indication of a destination. Then, the facsimile server 91 sends the data, which is received from the client 93, to the recipient via facsimile.

When the facsimile server 91 receives data from a remote machine over the public telephone line N1, it transfers the data to a particular client 93 who is registered beforehand for data reception. Reference numeral 94 designates a mail server and 95 a router connected to the internet N2. Electronic mails received from the internet N2 via the router 95 and electronic mails received from the clients 93 are stored in the mail servers 94. By logging into the mail server 94, the client 93 can receive and see the electronic mail. The client can also access the internet N2 through the router 95.

When the client 93 instructs facsimile data transmission, it should specify one facsimile server 91. Further, each client should be registered to one of the facsimile servers 91 in order for the client to receive data which the facsimile server has received from a remote machine via the public telephone line N1. Therefore, use and administration of the facsimile servers are somewhat complicated.

SUMMARY OF THE INVENTION

An object of the present invention is to provide a network facsimile system that is simplified in terms of use and administration of the facsimile servers.

According to one aspect of the present invention, there is provided a network facsimile system including a plurality of facsimile servers, a plurality of clients connected to the facsimile servers over a communication network, and a supervising server connected to the communication network such that the facsimile servers and clients communicate with each other via the supervising server. Therefore, the supervising server can administer communication between the facsimile servers and clients. This improves usage and administration of the facsimile servers. The communication network may be a LAN.

When the supervising server receives data from a certain client together with an instruction of facsimile transmission and indication of a recipient, it may select a proper facsimile server, send the data to the selected facsimile server and instruct that facsimile server to send the data to the indicated recipient. Unlike a conventional system, therefore, the client does not have to directly specify or instruct a facsimile server for facsimile data transmission.

If a facsimile server receives data from a remote machine and transfers it to the supervising server, the supervising server may select a proper client and deliver the data to the selected client. Unlike a conventional system, therefore, the facsimile server does not have to determine to which client the facsimile server should send the data received. Accordingly, no registration is needed in the facsimile server regarding the clients for data transfer.

According to a second aspect of the present invention, there is provided a network facsimile system including a plurality of facsimile servers, a plurality of clients connected to the facsimile servers over a communication network, and a supervising server connected to the communication network such that the facsimile servers and clients communicate with each other via the supervising server, with setting information of each of the facsimile servers being registered in the supervising server. This improves usage and administration of the facsimile servers. Particularly, administration of the setting information of the facsimile servers is simplified.

When a client wants to refer to the setting information of a certain facsimile server and sends such request to the supervising server along with indication of the facsimile server, the supervising server may notify the client of the setting information of that facsimile server. If the supervising server is designed in this manner, the client does not have to contact the facsimile server; instead, it is only necessary to contact the supervising server to obtain the setting information of the facsimile server.

When the supervising server receives setting information from a client along with a request of registration of that setting information and indication of a particular facsimile server, it may register that setting information and also request the designated facsimile server to register the same setting information. If the supervising server is configured in this way, registration of the setting information from the client is effected in the supervising server and facsimile server by simply accessing the supervising server.

According to a third aspect of the present invention, there is provided a network facsimile system including a plurality of facsimile servers, a plurality of clients connected to the facsimile servers over a communication network, a supervising server connected to the communication network such that the clients and facsimile servers communicate with each other via the supervising server, and authorization means associated with the supervising server for authorizing one or more clients to administer at least one of setting information of the supervising server and facsimile servers. For example, when a client wants to administer the setting information of a particular facsimile server, the supervising server uses the authorization means to determine whether it should give such authorization to the client. Accordingly, administration of the facsimile servers and supervising server is improved.

The authorization means may authorize different authorities to the respective clients and may have a table to indicate which client has what competence(s). Using such authorization means, the supervising server can easily recognize what competence(s) each client has, and give appropriate competence(s) to each client. This improves system security.

According to a fourth aspect of the present invention, there is provided a network facsimile system including a plurality of facsimile servers, a plurality of clients connected to the facsimile servers over a communication network, a supervising server connected to the communication network such that the plurality of facsimile servers and clients communicate with each other via the supervising server, and a memory associated with the supervising server for categorizing and storing the facsimile servers and clients into a plurality of groupings such that data communication is only enabled between facsimile server(s) and client(s) in a same group. For instance, when data transmission is tried between particular facsimile server and client, the supervising server refers to the memory and allows data transmission only if the facsimile server and client belong to the same group.

According to a fifth aspect of the present invention, there is provided a network facsimile system including a plurality of facsimile servers, a plurality of clients connected to the facsimile servers over a communication network, and a supervising server connected to the communication network such that the clients and facsimile servers communicate with each other via the supervising server. This supervising server stores recipient information such as telephone (or facsimile) numbers of recipient of facsimile data transmission, and the recipient information can be referred to by the clients. Accordingly, the recipient information for a plurality of clients is administered by a single module, i.e., supervising server. Further, it is unnecessary for the facsimile servers and clients to register the recipient information. This will save memories in the facsimile servers and clients.

Each recipient information may be accompanied by a certain indication that indicates which client can refer to which recipient information. If "common", "all clients" or "any client" is the indication, for instance, it means that all the clients can refer to that recipient information. If a name of particular client (e.g., "client A") is the indication, then the client A is only able to refer to that recipient information. This categorizes the recipient information into a first group to which all the client can refer and a second group to which a particular client (or clients) can refer. The recipient information may be stored in the form of a single telephone directory. This will save a memory in the supervising server.

BRIEF DESCRIPTION OF THE SEVERAL VIEWS OF THE DRAWINGS

FIG. 8 illustrates when a client registers supervising server's setting information in the supervising server;

FIG. 9A depicts an administration table;

FIG. 9B depicts an administrator list;

FIG. 11 shows another example of administration table;

FIG. 12 illustrates still another example of administration table;

FIG. 13A illustrates a client-group table;

FIG. 13B illustrates a fax server-group table;

FIGS. 16A, 16B and 16C illustrate telephone directories of the supervising server respectively;

FIG. 18 illustrates another example of telephone directory;

DETAILED DESCRIPTION OF THE INVENTION

Embodiments of the present invention will now be described with reference to the accompanying drawings.

First Embodiment

Figure 1:
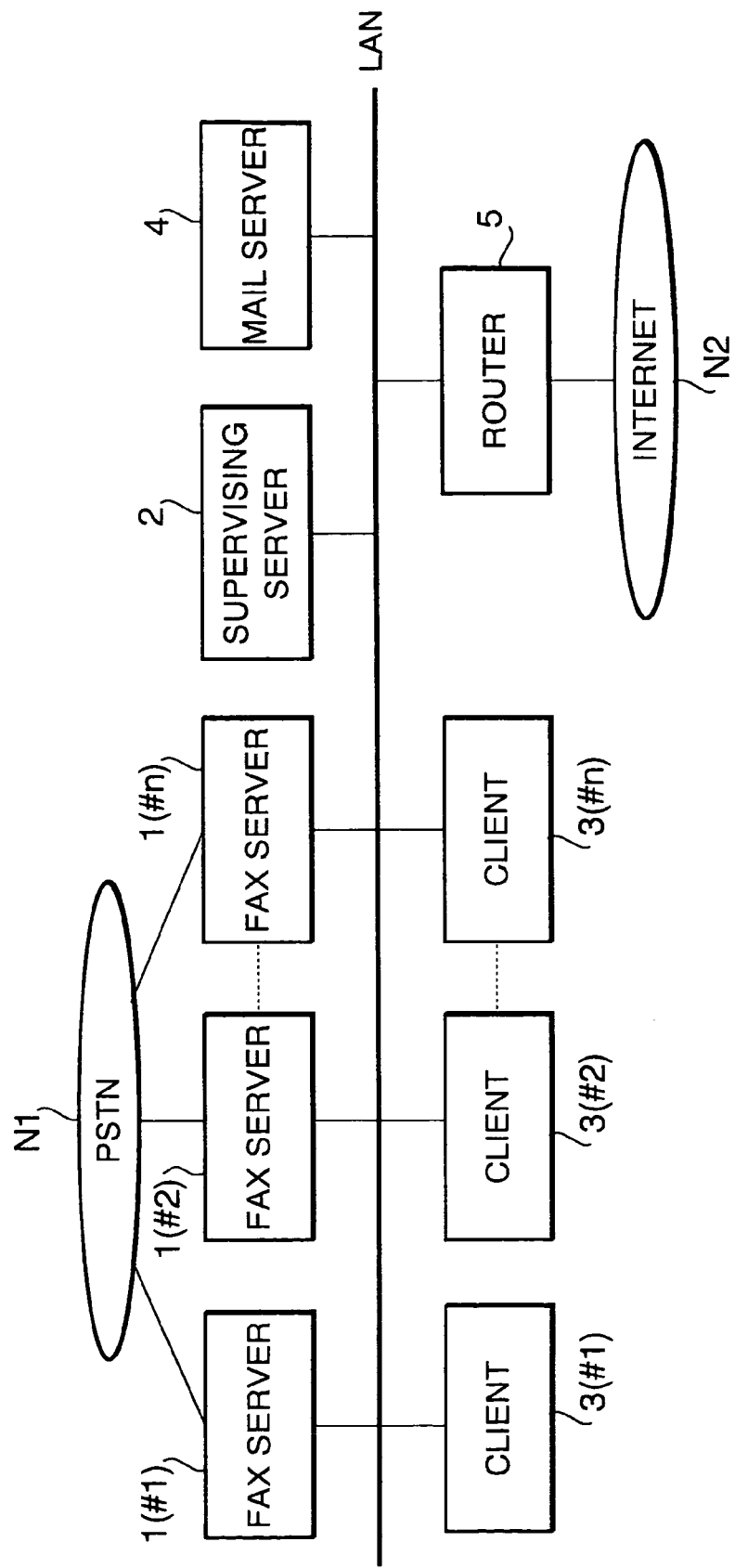
FIG. 1 is a block diagram schematically showing a structure of network facsimile system according to the present invention.

Referring to FIG. 1, illustrated is a network facsimile system according to the present invention that includes a plurality of facsimile servers 1 (#1 to #n) and a plurality of clients 3 (#1 to #n) connected over LAN, i.e., one example of communication networks. This system further includes a supervising server 2 connected to LAN. The facsimile servers 1 are connected to a public telephone line (PSTN) N1.

Reference numeral 4 designates a mail server and 5 a router connected to the internet N2. Electronic mails received from the internet N2 through the router 5 and electronic mails received from the clients 3 are stored in the mail servers 4. By logging into the mail server 4, the client 3 can receive and see the electronic mail. The client 3 can also access the internet N2 via the router 5. In this particular embodiment, LAN is employed as the communication networks. It should be noted, however, that WAN may be used instead of LAN.

The supervising server 2 is connected to all of the facsimile servers 1 by way of "all-time logging in" connection. Accordingly, by longing into the supervising server 2, each client 3 can communicate with all the facsimile servers 1. This logging in will be described in reference to the chart shown in FIG. 2.

User information (client information) 20 such as user ID and/or password of each client 3 is registered in the supervising server 2. If a client 3 requests log-in (100), a log-in request signal is sent to the supervising server 2 along with the user ID and/or password of the client 3. Then, the supervising server 2 compares the user ID/password just received with the user ID/password registered as the user information 20 (101). If one of the user information 20 coincides with the user ID/password sent (102), the supervising server 2 admits the logging in of that client 3 (103). On the other hand, if none of the registered information 20 matches the user ID/password sent from the client, the supervising server 2 refuses the logging in (104). It should be noted that the user information 20 in the supervising server 2 is provided from each client 3 by performing predetermined registration procedure. It is also possible to configure the system such that only some of the clients 3 may be able to register the user information into the supervising server 2. Further, the user information registration may only be allowed after entering a password.

Figure 2:
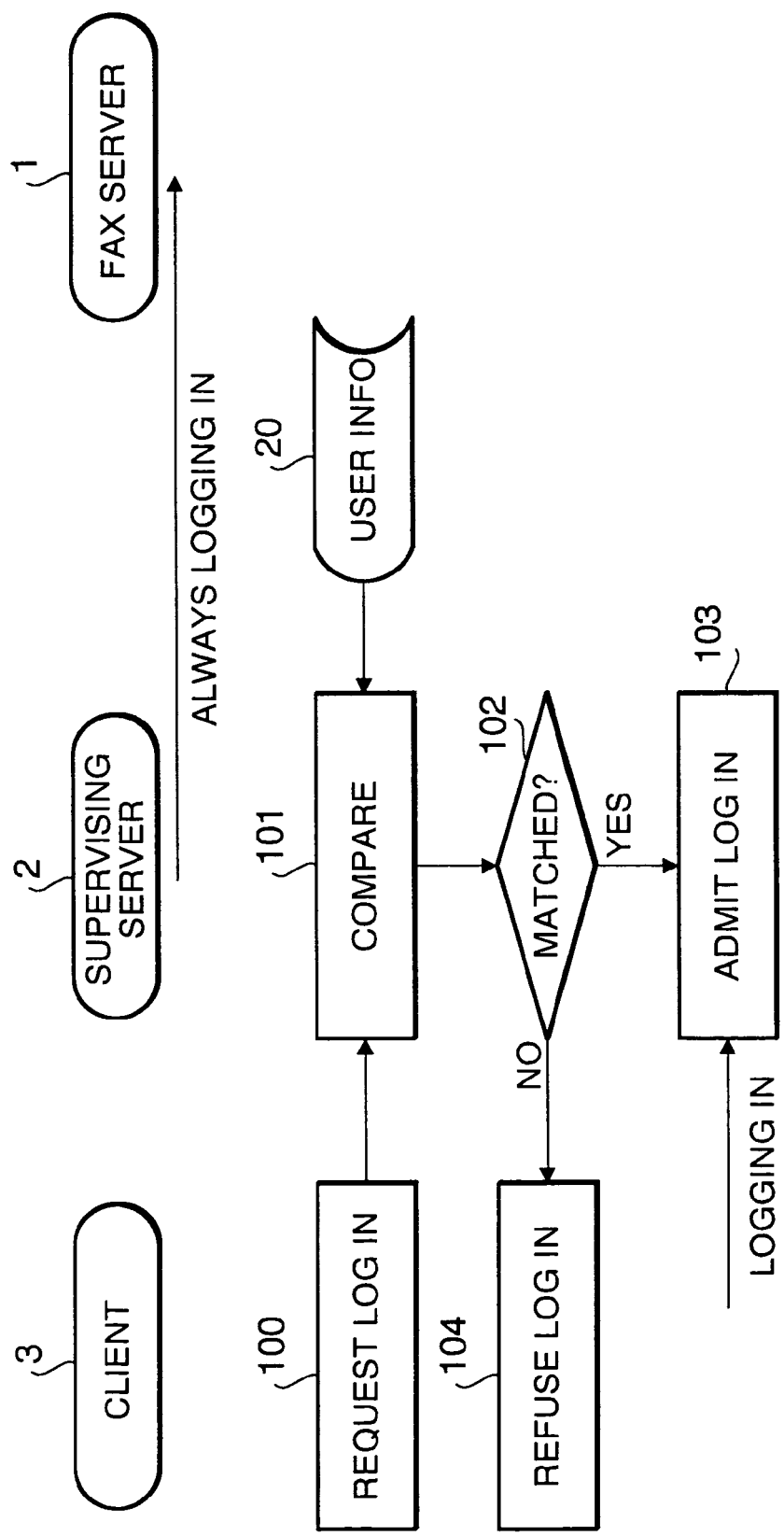
FIG. 2 is a chart showing an operation of the system when a client requests logging into the network in the system shown in FIG. 1.

If the log-in procedure shown in FIG. 2 succeeds, the client 3 can then communicate with the facsimile server(s) 1 in the following manner.

Figure 3:
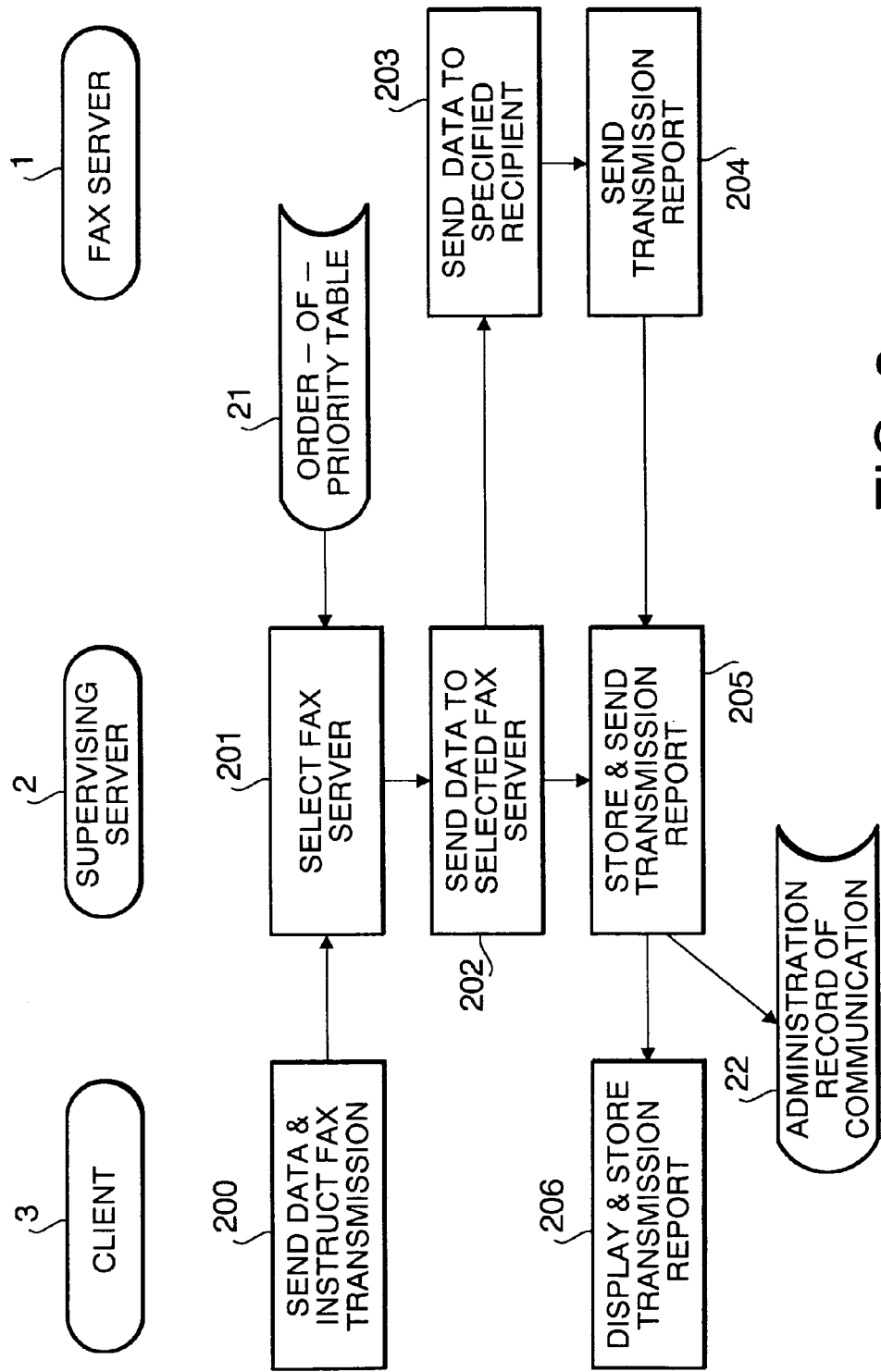
FIG. 3 illustrates a chart when a client instructs a facsimile server to send facsimile data to a remote machine.

When the client 3 wishes to send data to the facsimile server 1 and instructs facsimile transmission via the supervising server 2, a procedure shown in FIG. 3 is performed, for example.

The supervising server 2 has an order-of-priority table 21 in which the IP(Internet Protocol) addresses of the facsimile servers 1 or the like are registered in the order from the highest priority to the lowest. If a client 3 sends data to the supervising server 2 together with a facsimile transmission command including facsimile recipient information such as facsimile number of the recipient (200), the supervising server 2 refers to the table 21 and selects one facsimile server 1 based on the order of priority of the facsimile servers 1 (201). Then, the supervising server 2 sends the data, which is received from the client, to the selected facsimile server 1 and instructs facsimile transmission (202). If the firstly selected facsimile server 1 is in use, then the supervising server 2 selects another facsimile server 1, which is listed next in the table 21. It should be noted that a plurality of tables may be prepared for a plurality of clients 3 respectively, and selection of facsimile server 1 for a particular client 3 may be done using the associated table.

When the facsimile server 1 receives the data and instructions from the supervising server 2, it transmits the data to the designated recipient via facsimile (203) and prepares data transmission record. The data transmission record records a fact of successful or failed data transmission to the destination, and is sent back to the supervising server 2 (204). Upon receiving the data transmission record, the supervising server 2 records it as its own data transmission record 22 and also sends the record to the client 3 (205). As the client 3 receives the data transmission record, it displays the record and stores it in its own data transmission record (206). If the facsimile data transmission is broadcast transmission, the transmission record issued from the facsimile server 1 may be a single report covering the whole transmission or a plurality of reports separated for the respective transmissions.

Figure 4:
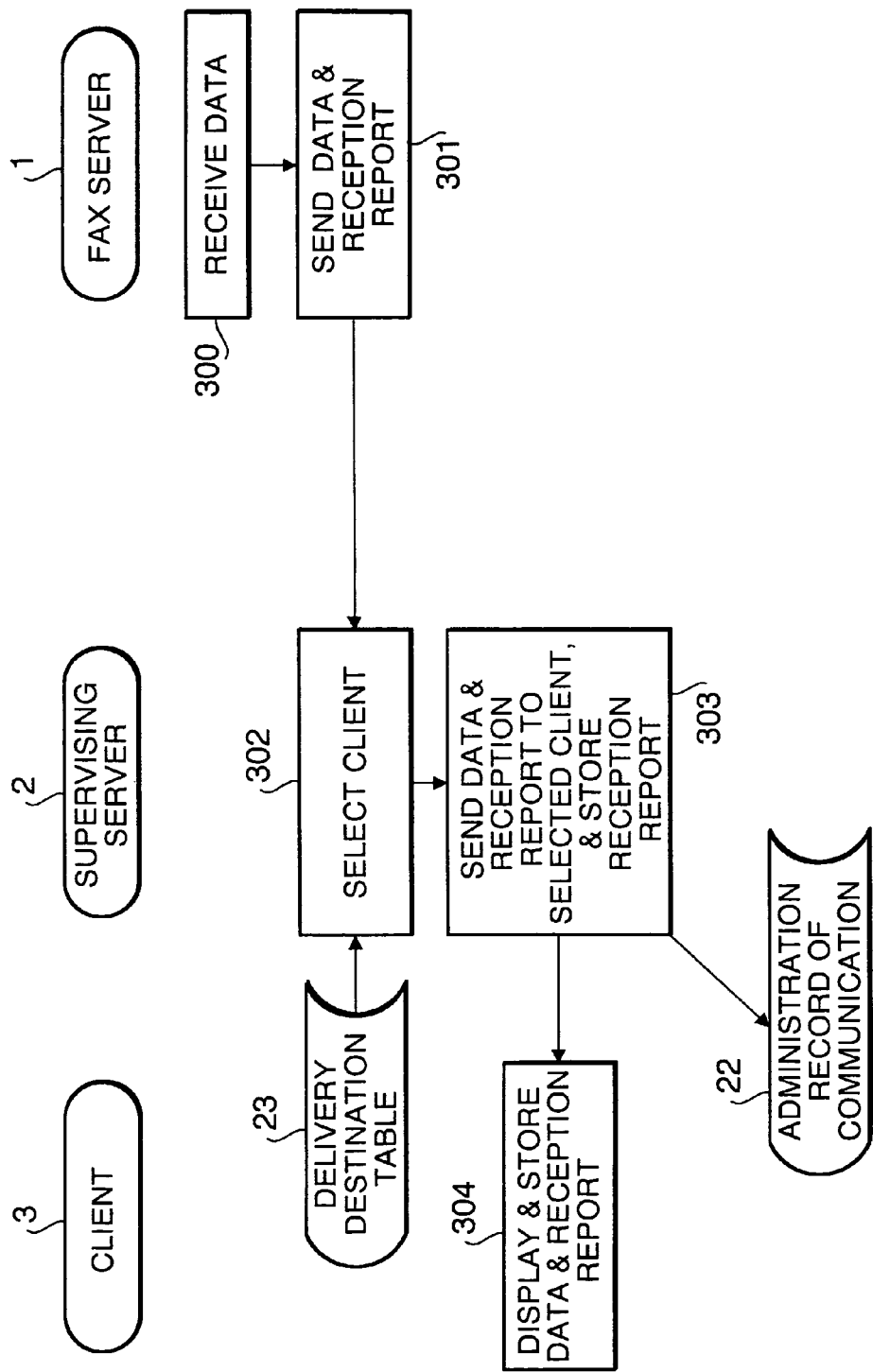
FIG. 4 illustrates when a facsimile server sends data to a client.

When the facsimile server 1 receives data from a remote machine over PSTN N1, it delivers the data to the client 3 via the supervising server 2 in a manner as illustrated in FIG. 4.

The supervising server 2 has a delivery table 23 in which remote machines' information such as names and facsimile numbers are registered in correspondence to user IDs of the clients 3. The remote machine's information is carried with the data from the remote machine. When the facsimile server 1 receives data from a remote machine via PSTN N1(300), it transfers that data and data reception record to the supervising server 2 (301). Upon receiving them, the supervising server 2 refers to the delivery table 23 to select a client 3 (302), and sends the data to the selected client 3 along with the data reception record. In the meantime, the supervising server 2 stores the data reception report in its own record 22 (303).

Upon receiving the data and data reception report from the supervising server 2, the client 3 displays them and stores in its own record (304).

Second Embodiment

The second embodiment uses the same network facsimile system as the first embodiment, which is shown in FIG. 1, and similar reference numerals designate similar elements in the first and second embodiments.

Figure 5:
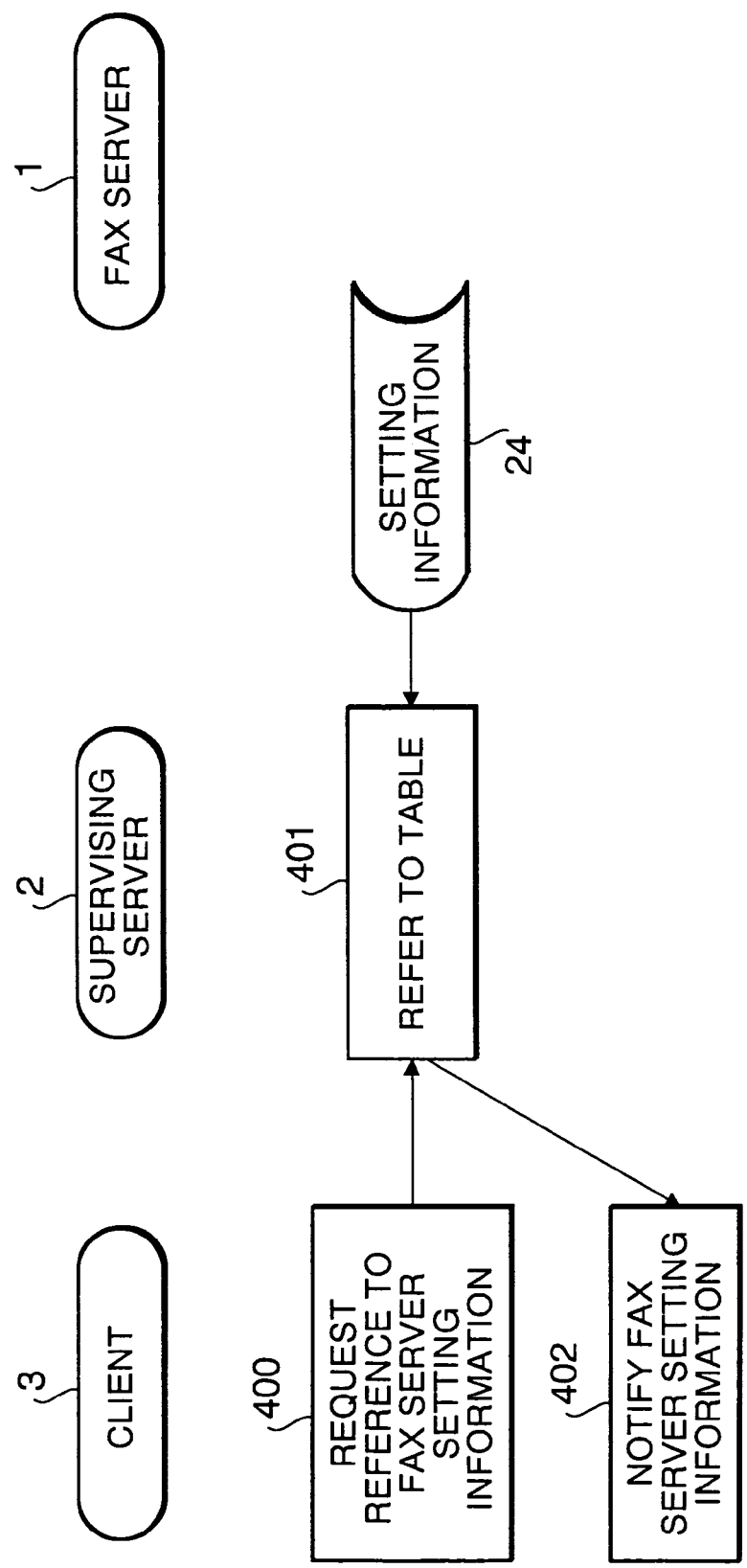
FIG. 5 illustrates when a client specifies a facsimile server and refers to setting information of the facsimile server.

Referring to FIG. 5, setting information 24 unique to respective facsimile servers 1 such as network information (e.g., IP addresses) and remote parties' information (e.g., names and telephone numbers) is registered in the supervising server 2. The setting information 24 is necessary for facsimile data transmission and input to the supervising server 2 by predetermined procedure (will be described). When a client 3 specifies a particular facsimile server 1 and requests reference to setting information of that facsimile server (400), the supervising server 2 refers to the setting information 24 (401) and provides the setting information of the specified facsimile server 1 to the client 3 (402).

Figure 6:
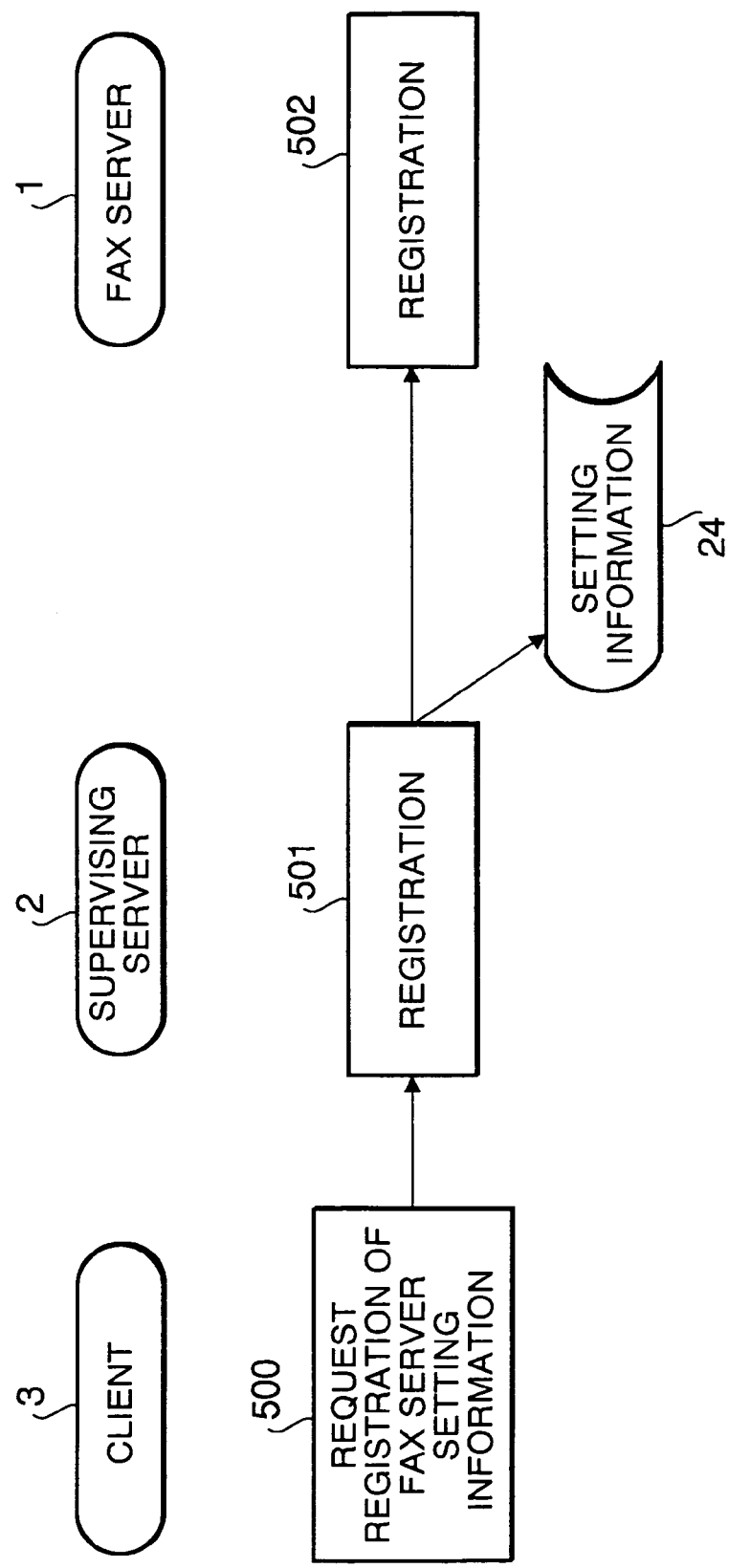
FIG. 6 illustrates when a client registers setting information in a supervising server.

Registration of the setting information in the supervising server 2 is performed in a manner shown in FIG. 6. As the supervising server 2 receives the setting information from the client 3 together with a registration request specifying a certain facsimile server 1 (500), it registers the setting information in the information table 24. The supervising server 2 then sends the setting information to the specified facsimile server 1 and requests the registration (501). Upon receiving the registration request, the facsimile server 1 registers the setting information (502).

Figure 7:
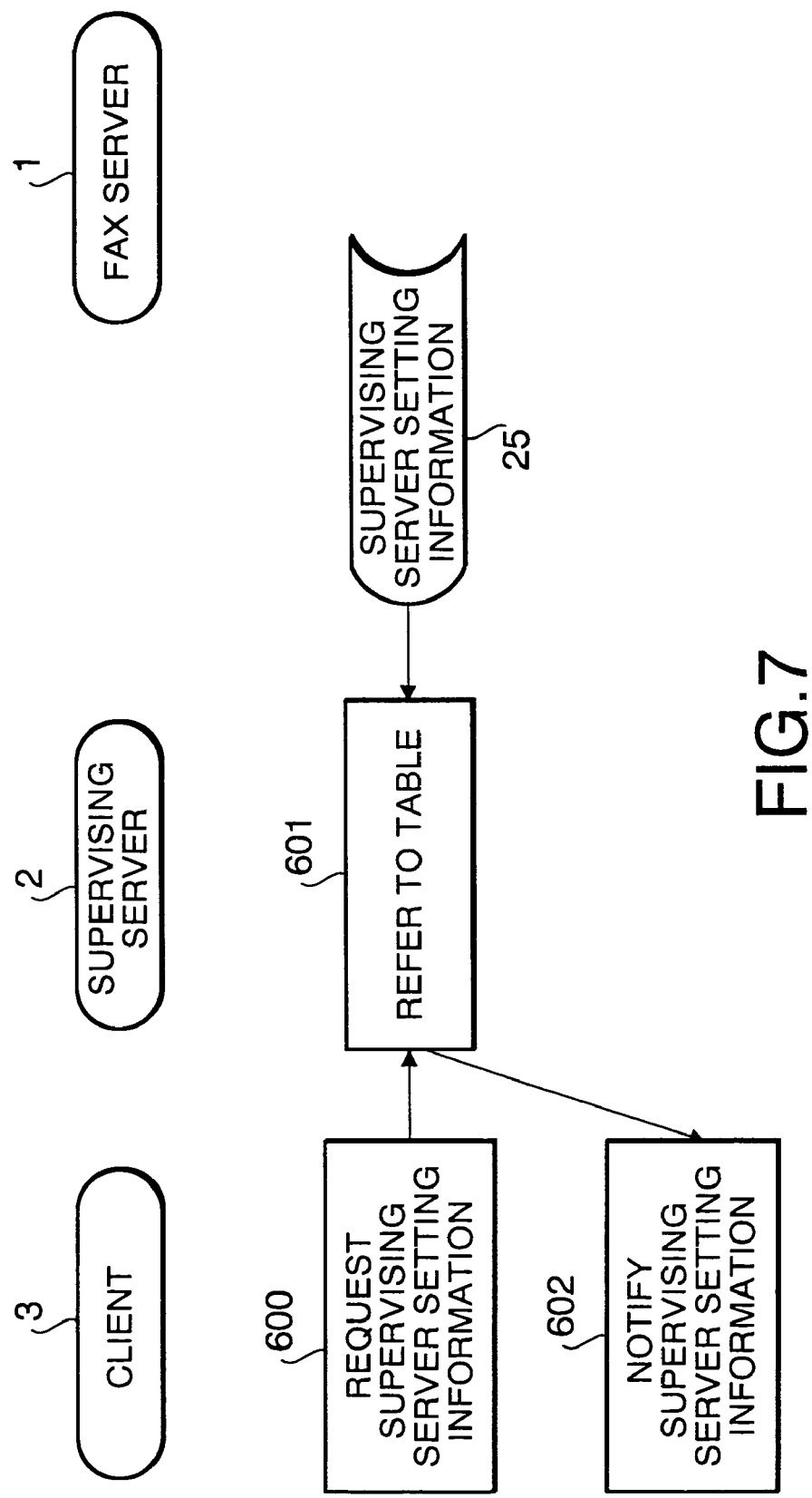
FIG. 7 illustrates when a client refers to supervising server's setting information which is registered in the supervising server.

Referring to FIG. 7, the supervising server 2 has its own setting information 25 unique to the supervising server 2 itself. This setting information 25 includes network information such as IP address. The supervising server 2 also has user information 20 (FIG. 2) such as user IDs and passwords, a table 21 of the order of priority (FIG. 3), and a table 23 of transmission destinations (FIG. 4). The information is registered in the supervising server 2 in a manner that will described below. Any client 3 can acquire the setting information of the supervising server 2 by referring to the supervising server 2.

Still referring to FIG. 7, will be described is the procedure for the client 3 to refer to the supervising server's setting information registered in the supervising server 2. When the client 3 sends a reference request to the supervising server 2 (600), the supervising server 2 refers to the supervising server setting information 25 (601) and provides the information to the client 3 (602).

Registration of the supervising server setting information in the supervising server 2 is performed in a manner shown in FIG. 8. If a client 3 sends to the supervising server 2 the supervising server setting information along with a registration request (700), the supervising server 2 registers the setting information as its own setting information 25 (701). By employing such way of registration, the clients 3 do not have to perform registration procedure (e.g., registration of user information) to the respective facsimile servers 2; instead, it is only necessary for the clients 3 to register the user information in the supervising server 2.

It should be noted that some of the clients 3 may only be allowed to perform the reference procedure and registration procedure shown in FIGS. 5 to 8. Entry of passwords or the like may be required to allow such clients 3 to perform the reference and registration procedures.

Third Embodiment

Like the second embodiment, the third embodiment uses the system as shown in FIG. 1, and similar reference numerals designate similar elements in the first and third embodiments.

The supervising server 2 is always logged into all the facsimile servers 1. If a client 3 logs into the supervising server 2 and instructs facsimile transmission, the supervising server 2 selects a facsimile server 1 and sends data, which has been received from the client 3, to the selected facsimile server 1 along with a command of facsimile transmission to a designated recipient. If facsimile data comes from a remote machine to the supervising server 2 via a certain facsimile server 1, the supervising server 2 selects a client 3 and transmits the data to the selected client 3.

In order to enable the supervising server 2 to perform the above-described procedure, various information needed for facsimile transmission such as setting information unique to the respective facsimile servers 1 is registered in the supervising server 2. The setting information includes, for instance, network information such as IP addresses and remote machines' (recipients) information. In each of the facsimile servers 1, registered are transmission destination information needed to send data provided from the client 3 to a desired destination and setting information to transmit data received from a remote machine over PSTN N1 to a designated client 3.

In this embodiment, the setting information registered in the supervising server 2 and facsimile servers 1 is administered by predetermined clients 3. To this end, the supervising server 2 is equipped with a means for specifying clients 3 who are authorized to administer the setting information.

As one example of such means, the supervising server 2 has an administration table 26 as shown in FIG. 9A. FIG. 9B illustrates a table of administrators 27. In the administration table 26a, registered are machines to be managed (i.e., facsimile servers 1 and supervising server 2) in connection with their managers (i.e., clients 3). The administrator table 27 lists the clients 3 selected as administrators. It should be noted that the client 3 who is authorized to manage the supervising server 2 (the client Z in FIG. 9A) may become administrators for all the facsimile servers 1. In such case, that single client 3 (client Z) can administer not only the supervising server 2 but also the whole facsimile servers 1.

Figure 10:
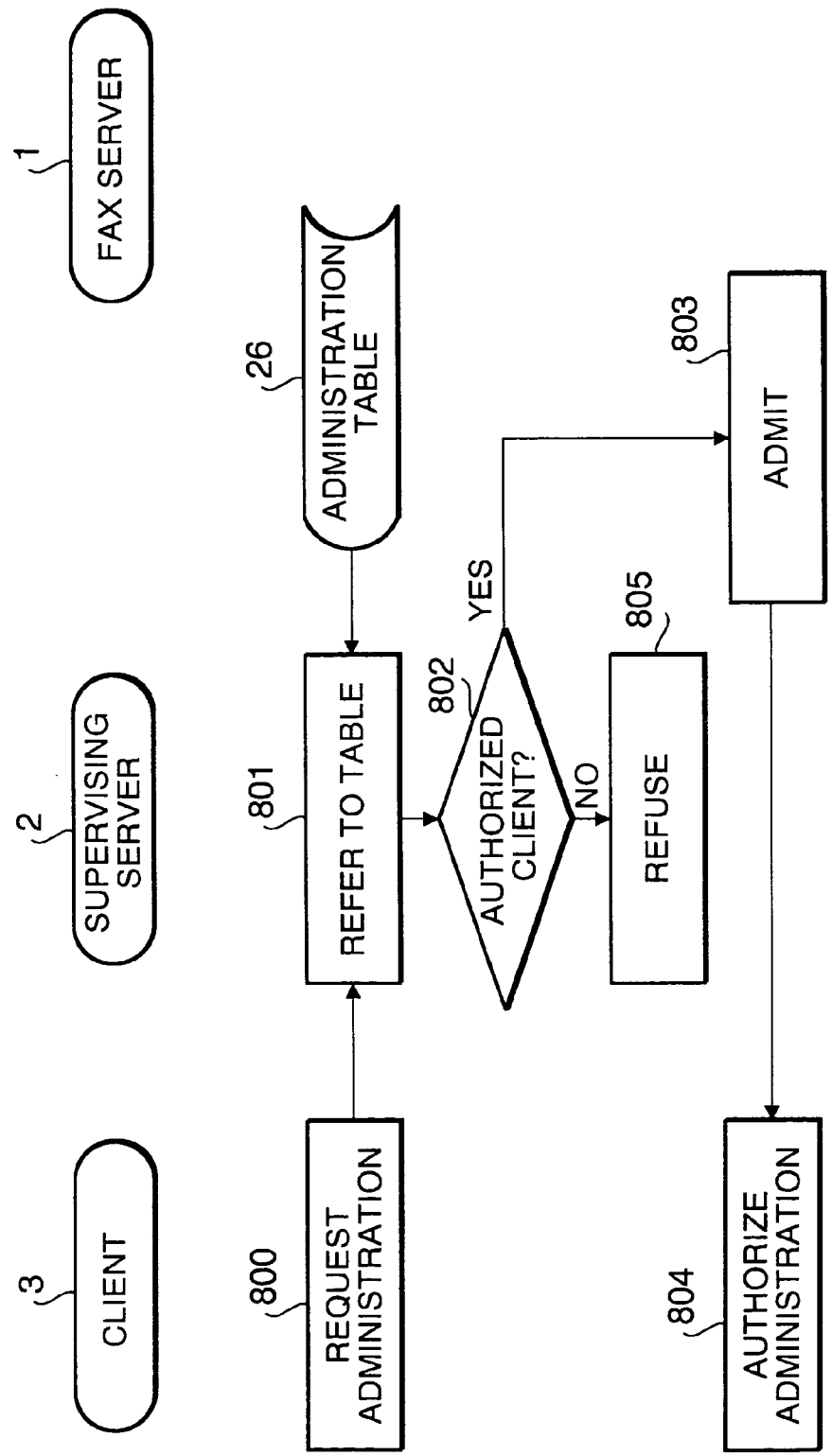
FIG. 10 illustrates when a client requests administration of particular machine.

Using such administration table 26a, the system of this embodiment performs administrator checking that will be described below in reference to FIG. 10.

When a certain client 3 sends a request to the supervising server 2 for administration of a particular facsimile server 1 or supervising server 2 (800), then the supervising server 2 refers to the administration table 26a (801) to determine whether this client 3 has authorization to administer the facsimile server 1 or supervising server 2 (802). If the answer is YES, the supervising server 2 admits the administration (803). Upon receiving this admission, the client 3 starts the administration (804). On the other hand, if the supervising server 2 determines that there is no authorization, it refuses the administration request (805) and notifies the client of such fact.

As described above, as the supervising server 2 receives an administration request from a certain client 3, it only authorizes the proper client 3 to control the setting information of the facsimile server(s) 1 and/or supervising server 2, based on the administration table 26a. Consequently, the administration environment is improved.

It should be noted that the administration table 26a may have a different structure as will be described in reference to FIGS. 11 and 12. The administration table 26b shown in FIG. 11 can register passwords to the respective clients 3. When the supervising server 2 receives an administration request from the client 3, it requires inputting of the password. The supervising server 2 uses this password to determine whether the client 3 is a proper client or not. Specifically, it authorizes the client to manage the setting information of the facsimile server 1 or supervising server 2 only when the password input by the client matches the registered one.

Another example of the administration table 26c is illustrated in FIG. 12. This administration table 26c can register competences to the respective clients 3. Upon having an administration request from the client 3, the supervising server 2 refers to the administration table 26c and gives the authority to the client 3 according to the contents of the administration table 26c. This improves security of the system.

Fourth Embodiment

The fourth embodiment uses the same system as the foregoing embodiments, which is shown in FIG. 1, and similar reference numerals designate similar elements in the first and forth embodiments.

The supervising server 2 is always logged into all the facsimile servers 1. In this embodiment, data communication is enabled only in a group consisting of particular facsimile server(s) 1 and client(s) 3 so that result of data transmission and reception can easily be administered.

To this end, the supervising server 2 is provided with two tables shown in FIGS. 13A and 13B as memory means. FIG. 13A illustrates a client-group table 28, in which group names are registered (assigned) to the respective clients. FIG. 13B illustrates a fax server-group table 29, in which group names are registered to the respective facsimile servers 1.

Figure 14:
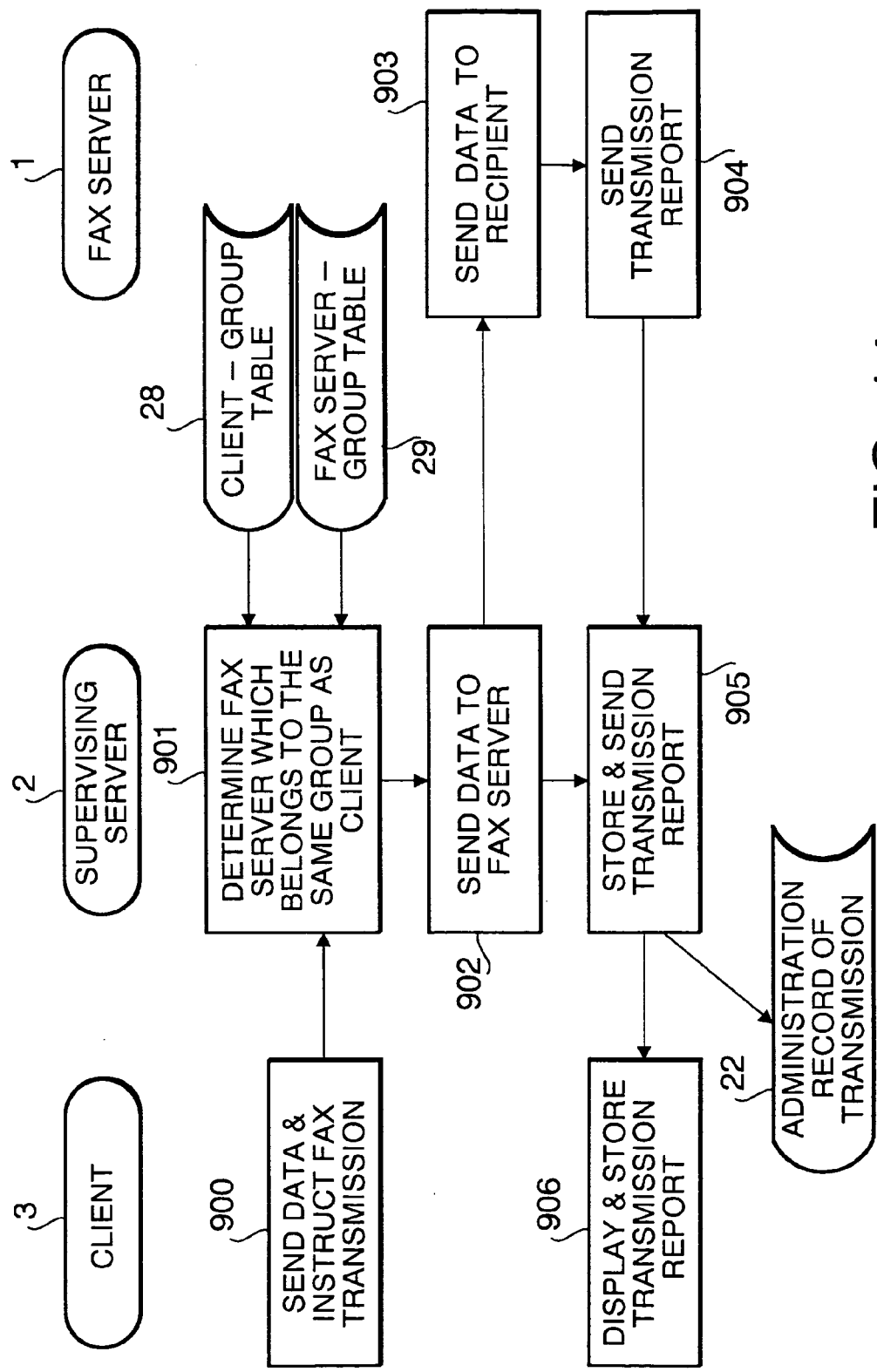
FIG. 14 illustrates when a client instructs a facsimile server to send facsimile data to a remote machine using the tables shown in FIGS. 13A and 13B.

Using these tables 28 and 29, the system operates as shown in the chart of FIG. 14. This drawing depicts a case where a client 3 sends data to a particular recipient via a facsimile server 1. As the supervising server 2 receives data from a certain client 3 together with information of facsimile transmission's destination (900), it refers to the client-group table 28 to find out the group to which the client 3 belongs, and subsequently refers to the facsimile server-group table 29 to determine which facsimile server 1 belongs to this group (901). Then, the supervising server 2 transmits the data, which it has received from the client 3, to the determined facsimile server 1 along with a command of facsimile-transmitting this data to the destination (902).

Subsequently, the facsimile server 1 transfers the facsimile data to the specified recipient (903), and sends the report of data transmission to the supervising server 2 (904). Upon receiving the transmission report, the supervising server 2 stores it in the form of administration record of transmission 22, and further transfers it to the client 3 (905). The client 3 then displays and stores the transmission report (906). If a plurality of facsimile servers 1 belong to the same group as the client, i.e., if the supervising server 2 determines two or more facsimile servers at 901, the supervising server 2 successively or simultaneously sends the data to these facsimile servers 1, and successively or simultaneously sends the transmission reports to the client.

Figure 15:
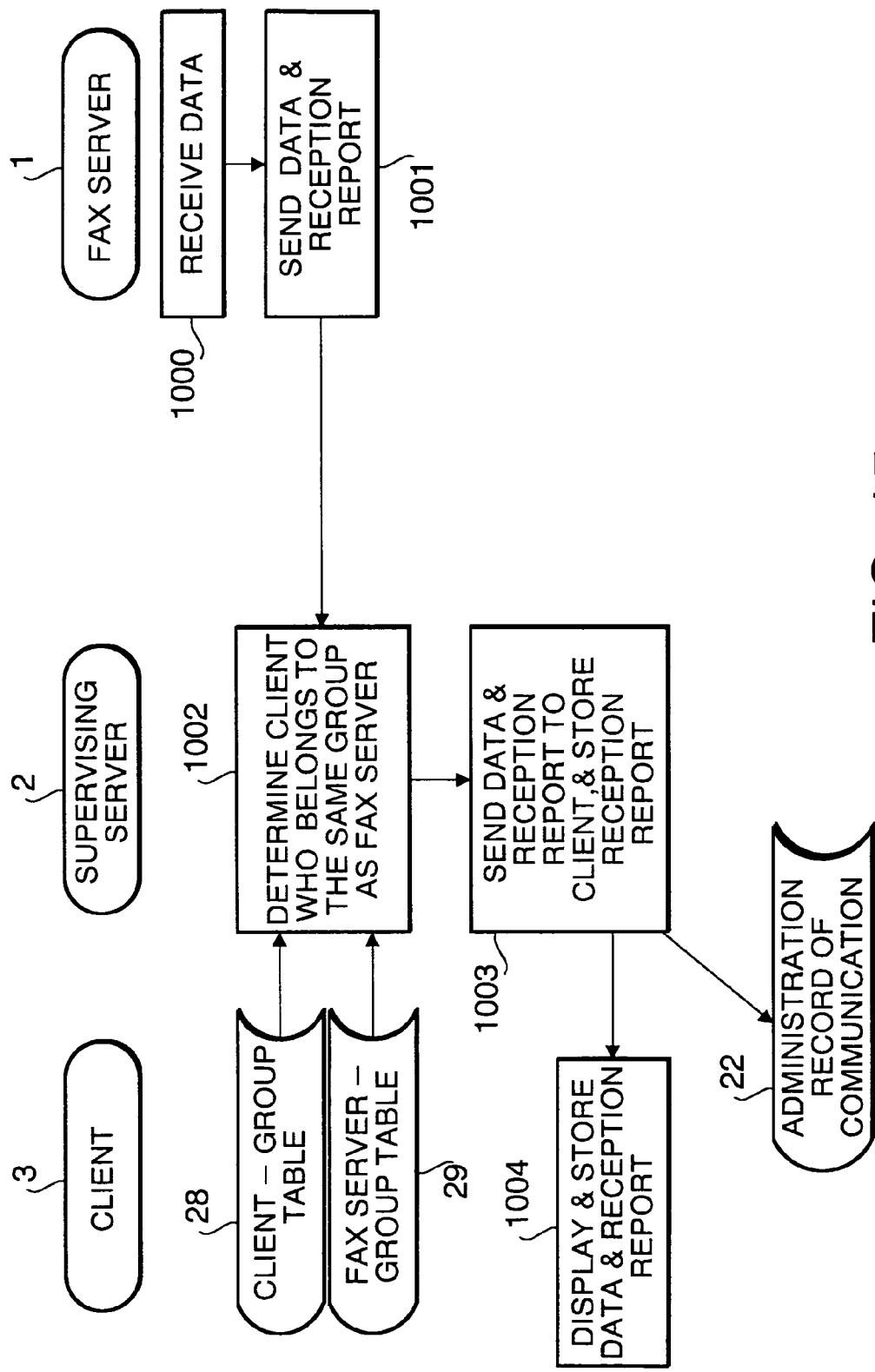
FIG. 15 is a chart showing an operation of the system when a facsimile server sends data to a client using the tables of FIGS. 13A and 13B.

Referring to FIG. 15, illustrated is a case where the facsimile server 1 receives data over PSTN N1 and delivers it to the client 3 via the supervising server 2. As the facsimile server 1 has data from a remote machine through PSTN N1 (1000), it sends the data to the supervising server 2 together with a reception report (1001). Then, the supervising server 2 refers to the facsimile server-group table 29 to determine to which group the facsimile server 1 belongs, and refers to the client-group table 28 to determine which client belongs to this group (1002). Subsequently, the supervising server 2 transmits the data and reception report to the determined client 3, and stores the reception report in the form of administration record of communication 22 (1003). If there are two or more clients determined, the supervising server 2 delivers the data and reception report to these clients 3 in a prescribed order or simultaneously.

The client 3 who has received the data and reception report from the supervising server 2 displays and stores the data and reception report (1004).

Fifth Embodiment

The fifth embodiment uses the same system as the first embodiment, which is shown in FIG. 1, and similar reference numerals designate similar elements in the first and fifth embodiments.

The supervising server 2 has various telephone books in this embodiment. When a client 3 instructs the supervising server 2 to send data via facsimile to a recipient registered in a telephone book, the supervising server 2 selects a facsimile server 1 for the specified recipient, and transfers the data to that facsimile server 1 along with a command of sending the data to the specified recipient.

The telephone directories of the supervising server 2 are illustrated in FIGS. 16A, 16B and 16C; namely, all-client common telephone directory 30, client X exclusive telephone directory 31 and client Y exclusive telephone directory 32. Each of these telephone directories 30 to 32 includes recipient information such as their names, facsimile numbers, e-mail addresses and optional functions, e.g., confidential transmission. The common telephone directory 30 can be used by all the clients 3. The client X dedicated directory 31 can be used by the No.1 client 3 (#1), and the client Y dedicated directory 32 can be used by the No.2 client 3 (#2).

Figure 17:
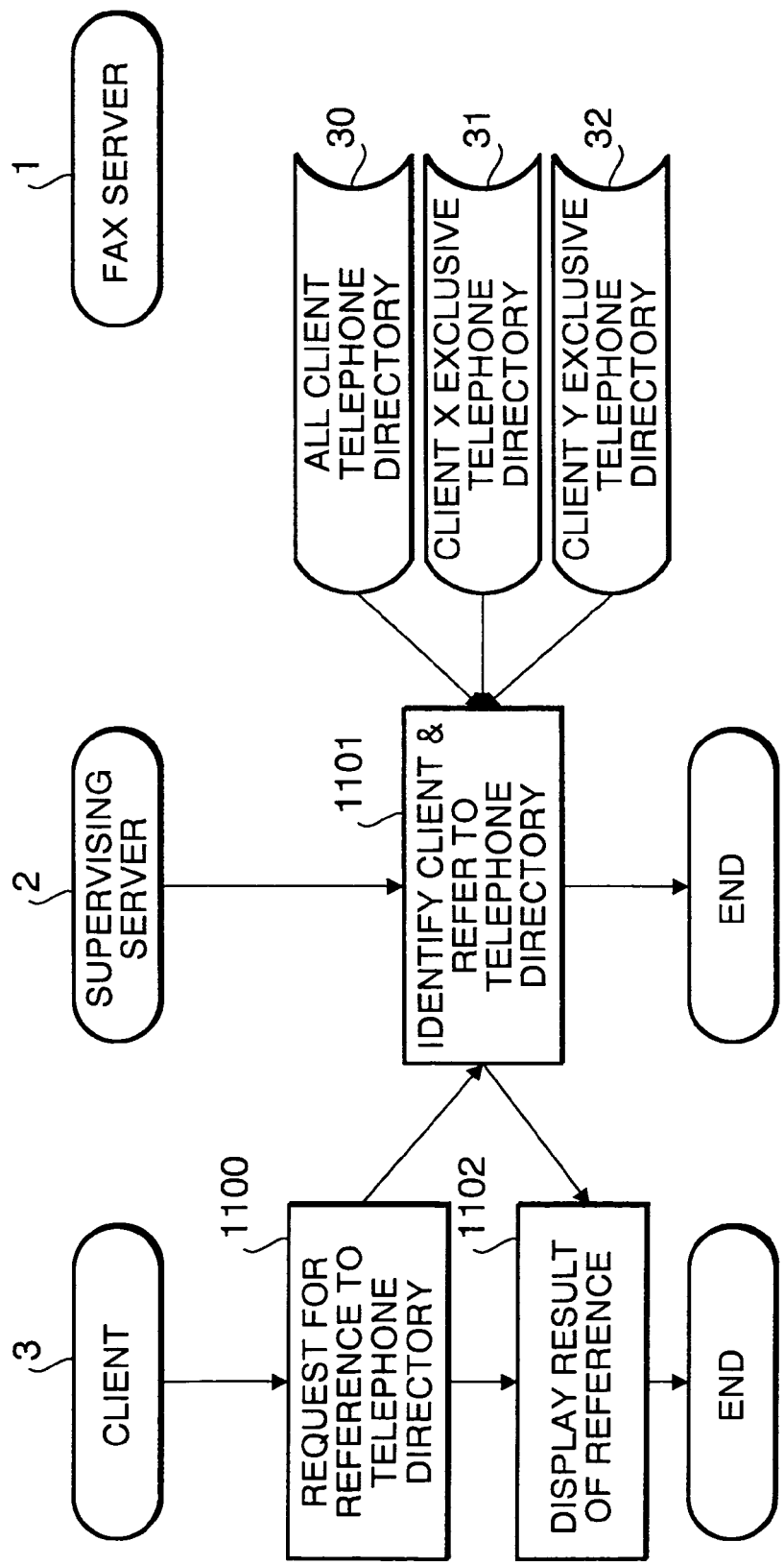
FIG. 17 illustrates when a client refers to a telephone directory.

The recipient information registered in the telephone directories 30 to 32 can be referred to by the respective clients 3 in a manner as illustrated in FIG. 17. When a client 3 requests reference to the supervising server 2 (1100), it also sends a user name or password of the client 3 to the supervising server 2. Therefore, the supervising server 2 is able to identify the client 3 from such user name or password, and performs a processing based on to the result of identification (1101).

It should be assumed here that the client 3 is a client X or Y in FIG. 17.

The supervising server 2 refers to the first telephone directory 30 whoever the client 3 is since this telephone directory is common to all the clients. The supervising server 2 also refers to the second telephone directory 31 if the client X is making a request. Likewise, it refers to the third telephone directory 32 in addition to the first telephone directory 30 if the client Y is a requester. The supervising server 2 obtains the recipient information from the telephone directory (or directories), and notifies the client of the recipient information as the report of the reference, whereby the client 3 can display it (1102). In this manner, the information of plural recipients, to whom a plurality of clients 3 try to send data, is administered by a single unit.

It should be noted that the illustrated embodiment is equipped with the three independent telephone directories, i.e., common telephone directory 30, client X exclusive telephone directory 31 and client Y exclusive telephone directory 32. However, the present invention is not limited in this regard. For example, as shown in FIG. 18, the supervising server 2 may only be equipped with a single telephone directory 33, which includes "attribute" 33A. The "attribute" 33A indicates which client is allowed to refer to which recipient information. This makes it unnecessary to prepare telephone directories for respective clients. Accordingly, a memory of the supervising server 2 can be saved.

Figure 19:
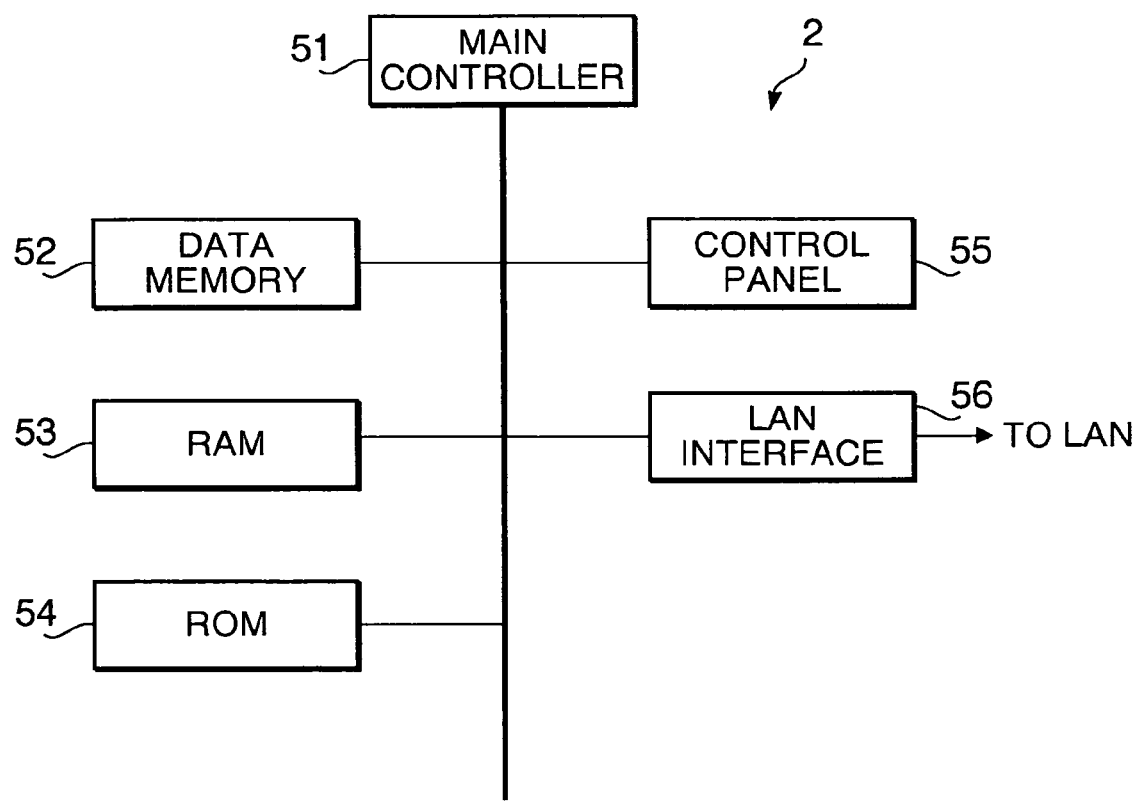
FIG. 19 is a block diagram illustrating a structure of the supervising server.
Figure 20:
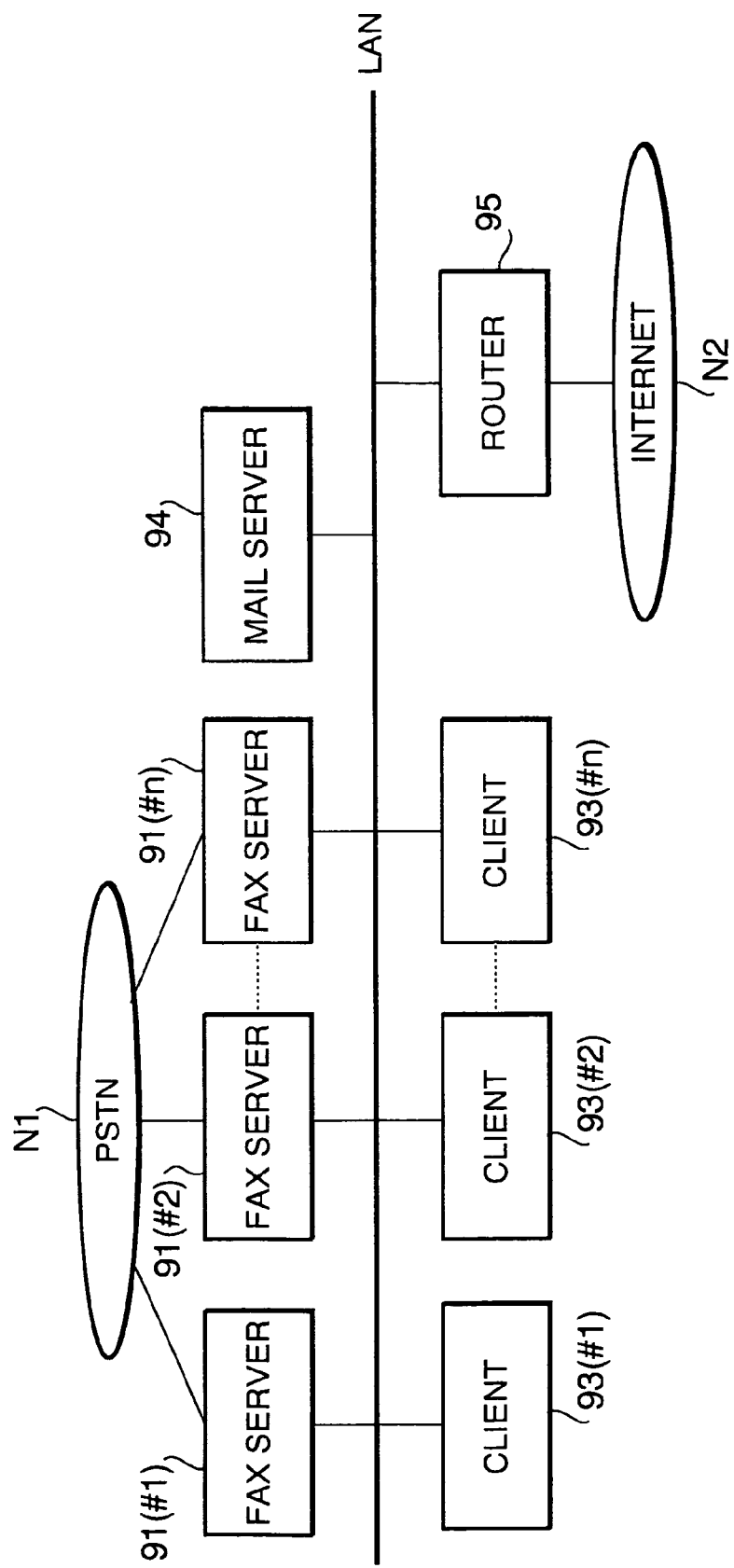
FIG. 20 schematically illustrates a conventional network facsimile system.

Supervising Server:

The supervising server 2 will now be described in detail with reference to FIG. 19. The supervising server 2 is common to all the foregoing embodiments.

The supervising server 2 includes CPU 51, data memory 52 for temporarily storing data supplied from the clients 3 and facsimile servers 1, RAM 53, ROM 54 for storing programs needed for the supervising server 2 to operate, and various keys. CPU 51 controls these hardware elements. RAM 53 contains the user information 20, order-of-priority table 21, record of communication 22, recipient table 23, setting information 24, supervising server setting information 25, administration table 26, administrator list 27, client-group table 28, fax server-group table 29, and telephone directories 30 to 33. The supervising server 2 also includes a control panel or operation unit 55 for registering user information and recipient information, and a LAN interface 56 for connection to IAN. When this supervising server 2 is connected to the network facsimile system made up of a plurality of facsimile servers and clients connected over a communication network, it can perform the above described operations to the network facsimile system.

The above described and illustrated network facsimile system and supervising server are disclosed in Japanese Patent Application Nos. 11-287104, 11-287105, 2000-58475, 2000-58476 and 2000-58477 filed in JPO on Oct. 7, 1999, Oct. 7, 1999, Mar. 3, 2000, Mar. 3, 2000 and Mar. 3, 2000, respectively, and the subject application claims the priority of these Japanese Patent Applications, the entire disclosures of which are incorporated herein by reference.

What is claimed is:

1. A network facsimile system comprising:
a plurality of facsimile servers;
a plurality of clients connected to the plurality of facsimile servers over a communication network; and
a supervising server connected to the communication network such that the clients and facsimile servers communicate with each other via the supervising server, the supervising server storing recipient information including telephone numbers of recipient of facsimile data transmission, and the recipient information being able to be referred to by the clients,
wherein each of the recipient information is accompanied by a certain indication including a client's name to indicate which client can refer to which recipient information, whereby the recipient information is categorized into a first group to which all the clients can refer and a second group to which a particular client or clients can only refer.

2. The network facsimile system of claim 1, wherein the second group of recipient information is accompanied by a plurality of indications such that the plurality of clients refer to the second group of recipient information respectively.

3. For use in a network facsimile system including a plurality of facsimile servers and clients connected to each other over a communication network, a supervising server connected to the network facsimile system such that the plurality of facsimile servers and clients communicate with each other via the supervising server, the supervising server being able to store recipient information including telephone numbers of recipient of facsimile data transmission such that the recipient information can be referred to by the clients under a certain constraint, wherein the recipient information is given a plurality of attribution labels that categorize the recipient information into a first group to which all the clients can refer and a second group to which a particular client or clients can only refer.

4. The supervising server of claim 3, wherein the second group of recipient information is accompanied by a plurality of attribution labels such that the plurality of clients refer to the second group of recipient information respectively.

* * * * *